United States Patent
Westenius et al.

(10) Patent No.: US 10,073,520 B2
(45) Date of Patent: Sep. 11, 2018

(54) METHOD AND SYSTEM FOR INTERACTION USING HOLOGRAPHIC DISPLAY SYSTEM

(71) Applicant: Sony Mobile Communcations Inc., Tokyo (JP)

(72) Inventors: Erik Westenius, Stockholm (SE); Jonas Gustavsson, Lund (SE); Linus Mårtensson, Löddeköpinge (SE); Martin Ek, Dalby (SE); Martin Grip, Furulund (SE); Ola Thörn, Limhamn (SE); Alce Günter, Trelleborg (SE)

(73) Assignee: Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/927,571

(22) Filed: Oct. 30, 2015

(65) Prior Publication Data

US 2017/0123490 A1  May 4, 2017

(51) Int. Cl.
   *G06F 3/01* (2006.01)
   *G02B 27/00* (2006.01)
   *G02B 27/01* (2006.01)
   *G06T 19/00* (2011.01)
   *G09G 3/00* (2006.01)
   *G09G 5/38* (2006.01)

(52) U.S. Cl.
   CPC ......... *G06F 3/013* (2013.01); *G02B 27/0093* (2013.01); *G02B 27/0172* (2013.01); *G06T 19/006* (2013.01); *G09G 3/003* (2013.01); *G09G 5/38* (2013.01); *G02B 2027/0174* (2013.01); *G02B 2027/0178* (2013.01); *G09G 2320/068* (2013.01); *G09G 2360/144* (2013.01); *G09G 2370/022* (2013.01)

(58) Field of Classification Search
   None
   See application file for complete search history.

(56) References Cited

U.S. PATENT DOCUMENTS

| | | | | |
|---|---|---|---|---|
| 6,625,299 B1* | 9/2003 | Meisner | ............... | G01S 5/16 348/169 |
| 8,160,747 B1* | 4/2012 | Blackwell | ............... | B25J 9/162 700/245 |
| 2004/0070565 A1* | 4/2004 | Nayar | ............... | G06K 9/4661 345/156 |
| 2007/0066394 A1* | 3/2007 | Ikeda | ............... | A63F 13/06 463/37 |

(Continued)

OTHER PUBLICATIONS

International Search Report and Written Opinion from counterpart International Patent Application No. PCT/EP2016/058583, dated Jun. 13, 2016.

*Primary Examiner* — Yi Wang
(74) *Attorney, Agent, or Firm* — Tucker Ellis LLP

(57) ABSTRACT

A method and system for displaying of a holographic image of an object in a predefined area. A positioning unit is configured for detecting positions of at least one viewer within the predefined area, a sensor is configured for detecting the environmental conditions within the predefined area, a processor is configured for collecting data including detected positions of viewers and detected environmental condition and calculating a location for displaying holographic image based on the collected data.

13 Claims, 3 Drawing Sheets

(56) References Cited

U.S. PATENT DOCUMENTS

| | | | |
|---|---|---|---|
| 2013/0293939 A1* | 11/2013 | Rotschild | G02B 27/2271 359/9 |
| 2014/0049559 A1* | 2/2014 | Fleck | G03H 1/2249 345/633 |
| 2016/0105658 A1* | 4/2016 | Choo | H04N 13/0018 348/40 |

* cited by examiner

METHOD AND SYSTEM FOR INTERACTION USING HOLOGRAPHIC DISPLAY SYSTEM

TECHNICAL FIELD

The disclosure pertains to the field of interaction using a holographic display system. In particularly it discloses methods and systems for interaction using a holographic display system by optimizing the placement of a holographic image within a predefined area.

BACKGROUND ART

Smart-glasses, googles or other Head Mounted Displays, HMD, are commonly utilized to interact with virtual objects, such as 3D objects, holographic objects or the like.

Optical see-through HDMs, OHMD, are known and they allow users to see each other and view the real world normally simultaneously with virtual objects. Additionally, optical see-through HMDs let users readily use normal face-to-face communication and provides for long distance collaborative interaction.

One example of an Optical see-through HMD system is the HoloLens system by Microsoft. The HoloLens system includes a smart-glasses headset provided with a cordless, self-contained computer. The headset comprises sensors with related hardware, including depth sensors, photo/video camera and a holographic processing unit. The visor piece is a pair of transparent combiner lens, in which the projected images are displayed in the lower half. Among the sensor types is an energy efficient depth-camera, a microphone array, a photographic video camera and an inertial measurement unit, including an accelerometer, a gyroscope and a magnetometer.

The negative effect of using the above mentioned display system is to find the best placement of the virtual object i.e. when there is more than one viewer.

Thus, there is a need to optimize where and how to place virtual objects in the real world during interaction with several viewers.

SUMMARY OF THE INVENTION

With the above description in mind, then, an aspect of some embodiments of the present invention is to provide a method and system for mapping out predefined area and the people in order to optimize the positioning of the virtual object, which seeks to mitigate, alleviate or eliminate one or more of the above-identified deficiencies in the art and disadvantages singly or in any combination.

An aspect of the present invention relates to a method for displaying of a holographic image of an object in a predefined area. The method comprising detecting a position of at least one viewer present in said predefined area, detecting environmental conditions within said predefined area, determining a location for displaying said holographic image of said object based on said detected position of said at least one viewer and said detected environmental conditions and displaying said holographic image of said object at said determined location.

Another aspect of the present invention relates to a system for displaying of a holographic image of an object in a predefined area. The system comprising at least one positioning unit configured for detecting positions of at least one viewer within said predefined area, at least one sensor configured for detecting the environmental conditions within said predefined area, a processing unit. The processing unit is configured for collecting data comprising said detected positions of viewers and detected environmental conditions and calculating a location for displaying said holographic image based on said collected data. The system further comprising a display unit assigned to each viewer within said predefined area, wherein said display unit is configured for displaying said holographic image of said object at said calculated location.

The features of the above-mentioned embodiments can be combined in any combinations.

Some embodiments of the invention provide a method for displaying a holographic image of an object at an optimized position. It is an advantage with some embodiments of the invention that they may allow for interaction with collaborators/viewers and the holographic image at the same time. It is an advantage that when placing the virtual object in a room then surrounding environment is considered such as light conditions and the location of different object in a room.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

Figure 1:
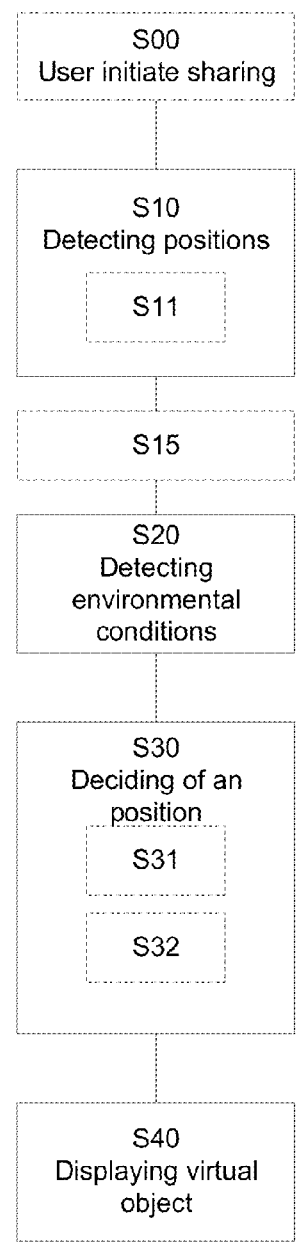
FIG. 1 is a flowchart illustrating the proposed method.

It should be added that the following description of the aspects/embodiments is for illustration purposes only and should not be interpreted as limiting the disclosure exclusively to these embodiments/aspects.

DETAILED DESCRIPTION

Aspects of the present disclosure will be described more fully hereinafter with reference to the accompanying drawings. The system, devices and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the present invention will be exemplified using an electronic device such as a mobile communication device including a head mounted display, HMD. Examples of such devices may for instance be any type of wearables in the form of glasses, visors, goggles, contact lenses, etc. For the sake of clarity and simplicity, the embodiments outlined in this specification are exemplified with, and related to wearable display devices only.

The terms wearable and wearable device are used interchangeably and is referring to a wireless electronic device which is worn somewhere on the body of a user. Examples of wearables are watches, wristbands, headsets, headbands, necklaces, glasses, googles etc.

When a user of an Optical Head Mounted Display, OHDM initiates sharing, the system needs to detect if there are other users in the same room, where in the room they are positioned and in which direction they are looking, the eye position, in order to provide a better collaborative interaction between the viewers, users, collaborators etc. Detecting other collaborators and their rough position can be achieved with known technology such as, indoor positioning and WIFI-positioning. However, these techniques do not consider in which direction the users are looking and if something is in the way. For an example, if all collaborators are not gathered around the table they should see the shared virtual object in front of them. On the contrary, if all collaborators are watching towards a centre, the optimal area to place the virtual object could be calculated. But with the known technology such as Wi-Fi and indoor positioning it is not possible to detect e.g. if a plant is in the way or light walls.

In order for virtual objects to be displayed precisely on an optimized position on the real world, users' viewpoints need to be tracked. Other issues that need to be considered are the size of the virtual object and the light conditions in order to give the best user experience. The disclosure provides a method and system for tracking user's viewpoint, eye position, and registration of objects nearby.

Figure 2:
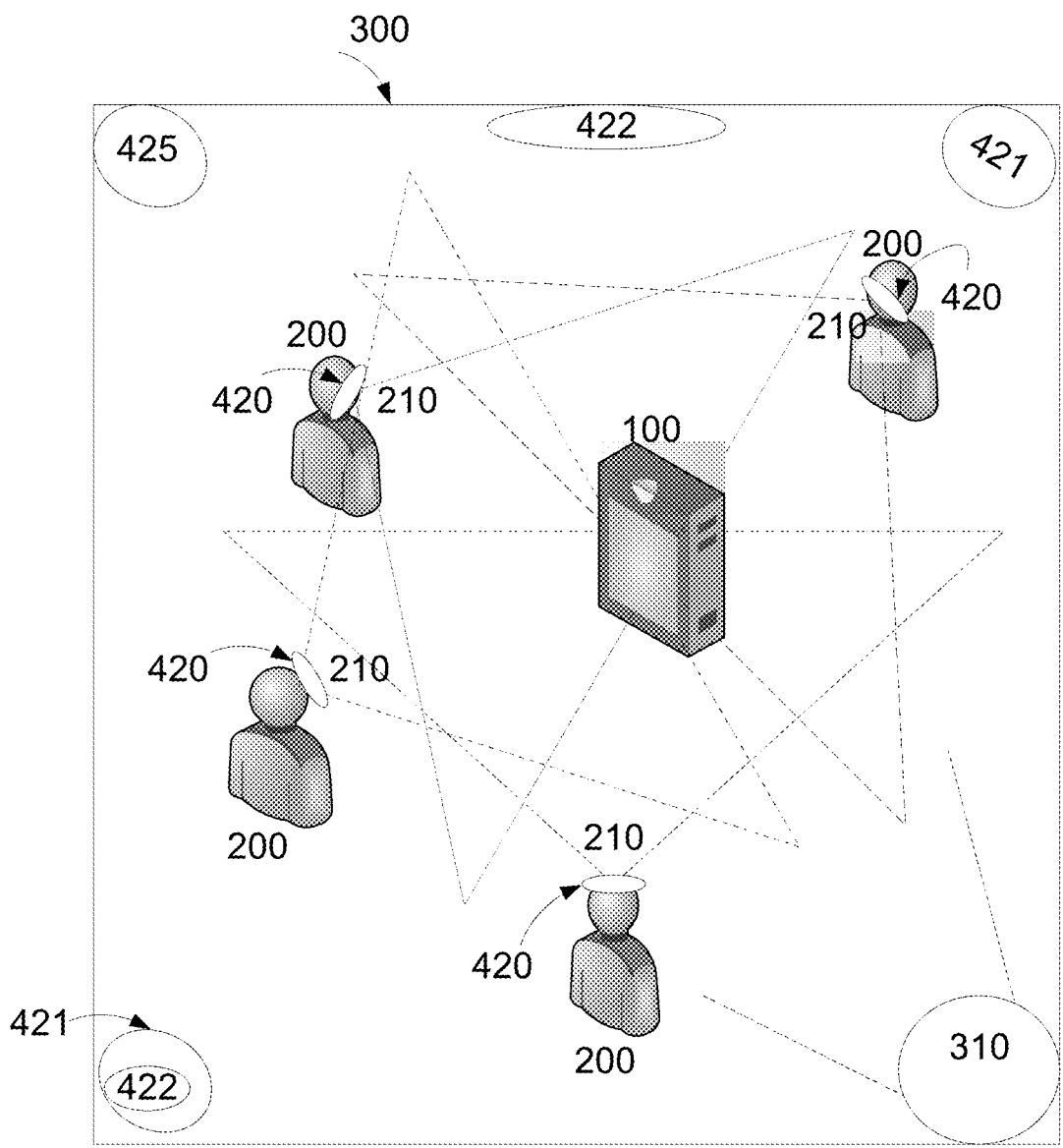
FIG. 2 illustrates an example of the proposed system.
Figure 3:
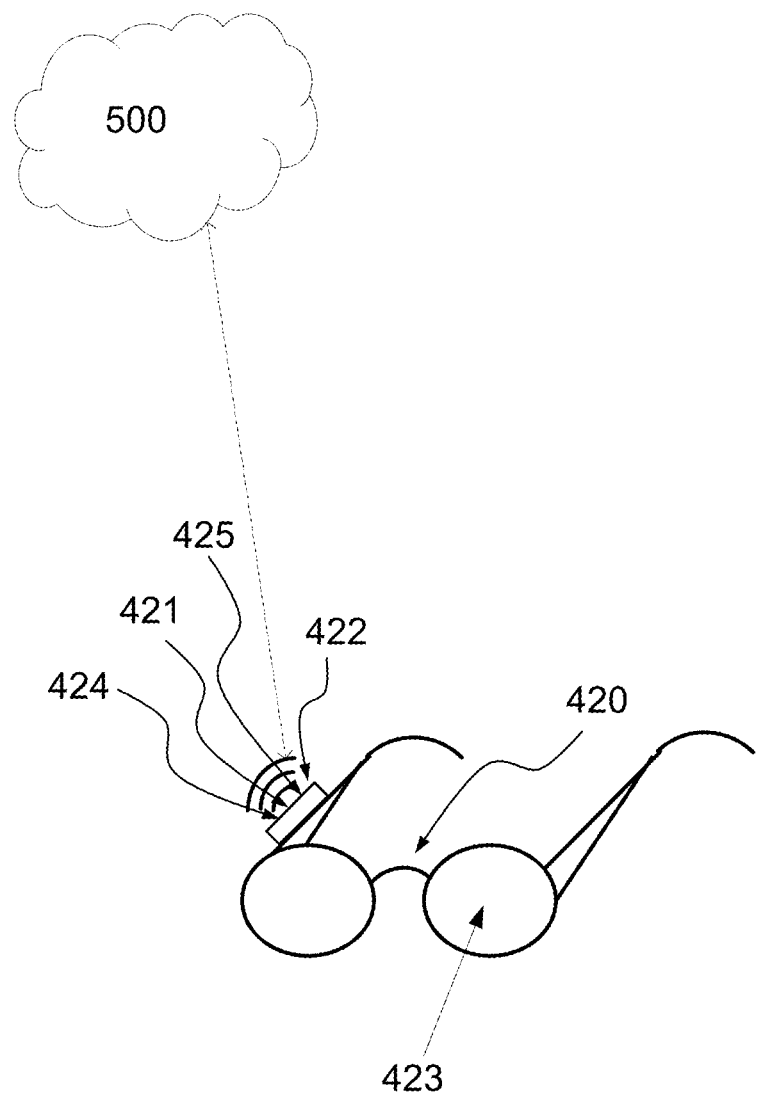
FIG. 3 illustrates an example of an OHMD.

According to some aspects the disclosure provides for a method, performed in a holographic system, for displaying of a virtual object, such as 3D image or a holographic image 100 of an object, as can be seen in FIG. 1. According to some aspects the disclosure provides for a system for displaying of a virtual image 100 of an object in the predefined area 300, as can be seen in FIG. 2. The holographic system comprises at least one HMD comprising communication circuitry 424 and processing circuitry 425, as can be seen in FIG. 2 and FIG. 3.

The communication network may be any wireless communication network, including but not limited to Blue Tooth® (BT), Wireless Local Area Network (WLAN), Body Area network (BAN), wireless body area network (WBAN), Wide Area Network (WAN), cellular networks, cellular connectivity, optical communication network, ultrasonic communication network, etc.

FIG. 1 is a flow diagram depicting example operations which may be taken by the system of FIG. 2.

It should be appreciated that FIG. 2 comprise some operations which are illustrated with a solid border and some operations which are illustrated with a dashed border. The operations which are comprised in a solid border are operations which are comprised in the broadest example embodiment. The operations which are comprised in a dashed line are example embodiments which may be comprised in, or a part of, or are further operations which may be taken in addition to the operations of the broader example embodiments. It should be appreciated that the operations need not be performed in order. Furthermore, it should be appreciated that not all of the operations need to be performed.

According to some aspects, the method comprises the step of detecting S10 the position of at least one viewer 200 present in a predefined area 300. The predefined area may be a room, a part of a room, a conference room, a predefined area outside or the like. In some aspect the step of detecting the position S10 further comprises the step of detecting 511 the position of one or more objects, such as chairs, tables, flowers, trees, etc. present in the predefined area 300. In some aspects the system comprises at least one positioning unit 421 configured for detecting positions of at least one viewer 200 within the predefined area. In some aspects the positioning unit 421 is further configured for detecting S15 the eye position of each viewer 200. In some aspects the positioning unit 421 is further configured for detecting the position of one or more objects present in the predefined area 300. The positioning unit 421 may be a camera, radar, sound unit, GPS unit, WiFi positioning unit or the like. In some aspect the positioning unit 421 is comprised in a communication device of at least one viewer 200 such as a mobile telephone, smart-glasses etc.

According to some aspects the method further comprises the step of sharing S00 display of a virtual object 100. In one embodiment a first viewer 200 share the right to view to at least one other viewer 200 before displaying the virtual object 100 for security reasons.

The method also comprises the step of detecting S20 environmental conditions within the predefined area 300. The environmental conditions may be light conditions within the room, such as different light sources, weather conditions, such as sunlight shining through a window, direction of light, angles of light. In some aspect, the step of detecting S20 environmental conditions further comprises detecting the light conditions within the predefined area 300. In some aspect, the step of detecting the light conditions further comprises detecting position of one or more light sources 310 and the direction of light from the one or more light source. In some aspects the system comprises at least one sensor 422 configured for detecting the environmental conditions within the predefined area 300. In some aspects the at least one sensor is further configured for detecting the light conditions in the predefined area 300. In some aspects the at least one sensor is further configured for detecting position of one or more light sources and a direction of light from the one or more light sources. In some aspects the at least one sensor 422 is comprised in a communication device 420 of at least one viewer 200.

The method comprises the step of determining S30 a location for displaying the holographic image of the object 100 based on the detected position of the at least one viewer 200 and the detected environmental conditions. In some aspects the step of determining a location further comprises the step of detecting S15 the eye position of each viewer 200, determining S31 a field of vision 210 of each viewer 200 present in the predefined area 300 based on the detected eye position and calculating S32 the location for displaying the holographic image of the object based on the determined field of vision 210. In some aspect the field of vision 210 is a triangle that spans between 90-150 degrees, preferable a span of 120 degree. In some aspect the system comprises a processing unit 425, i.e. a processor, configured for collecting data comprising the detected positions of viewers and detected environmental conditions and for calculating a location for displaying the holographic image based on the collected data. In some aspect, the processor 425 is further configured for determining S31 a field of vision 210 of each viewer 200 present in the predefined area 300 based on detected eye positions of the viewers and for calculating S32 the location based on the determined field of vision 210. In some aspect the processor 425 is comprised in a communication device 420 of each viewer 200. In some aspect the processor 425 is comprised in an external server or in a remote server, such as a cloud server 500.

The method comprises the step of displaying S40 the holographic image of the object 100 at the determined location. In some aspect the system comprises a display unit 423 assigned to each viewer within the predefined area 300, wherein the display unit is configured for displaying the holographic image of the object at the calculated location. The display unit may be a display in a pair of googles, glasses, contact lenses or the like.

In one embodiment, a depth camera disclosed in the OHMD of each participant are used to map out the room, the objects and people in it in order to optimized the placement of the virtual object, as shown in FIG. 2. Each triangle corresponds to the field of vision for each participant that spans 120 degree of the depth camera. The most covered area is a potential spot to place the hologram.

In one embodiment, the optimized location for collaboration or interaction is adjusted depending on the light source 310. If there is a strong light spot from the side as shown in FIG. 2 the virtual object is adjusted accordingly. Since the size of the room and the location of each collaborator/viewer are mapped the size of the virtual object can also be optimized accordingly. An optimized location is a location where features of a holographic image of an object is displayed at a view that is best for all viewers from a visual, User experienced (UX), ergonomic or interaction point of view.

This solution let the participants use speech, gesture, gaze, and nonverbal cues to attempt to communicate as well as interact with virtual objects since they can see each other and the real world simultaneously with the virtual objects.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented according to some aspects by a computer program, comprising computer readable code which, when run on an electronic device, causes the electronic device to perform the method according to above. The computer program, embodied in a computer-readable medium, includes computer-executable instructions, such as program code, executed by computers in networked environments. A computer-readable medium may include removable and non-removable storage devices 23 including, but not limited to, Read Only Memory, ROM, Random Access Memory, RAM, compact discs, CDs, digital versatile discs, DVD, etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

Item

Item 1. A method for displaying of a holographic image of an object in a predefined area comprising:
  detecting a position of at least one viewer present in said predefined area;
  detecting environmental conditions within said predefined area;
  determining a location for displaying said holographic image of said object (100) based on said detected position of said at least one viewer and said detected environmental conditions; and
  displaying said holographic image of said object at said determined location.

Item 2. The method according to item 1, wherein determining a location further comprises:
  detecting the eye position of each viewer;
  determining a field of vision of each viewer present in said area based on said detected eye position;
  calculating the location for displaying said holographic image of said object based on the determined field of vision.

Item 3. The method according to item 2, wherein the field of vision is a triangle that spans between 90-150 degrees.

Item 4. The method according to item 1, wherein detecting positions further comprising detecting the position of one or more objects present in said predefined area.

Item 5. The method according to item 1, wherein detecting environmental conditions further comprising detecting the light conditions in said predefined area.

Item 6. The method according to item 5, wherein detecting the light conditions further comprising detecting position of one or more light sources and the direction of light from said one or more light source.

Item 7. A system for displaying of a holographic image of an object in a predefined area comprising:
  at least one positioning unit configured for detecting positions of at least one viewer within said predefined area;
  at least one sensor configured for detecting the environmental conditions within said predefined area;
  a processing unit configured for:
    i. collecting data comprising said detected positions of viewers and detected environmental conditions; and ii. calculating a location for displaying said holographic image based on said collected data;
a display unit assigned to each viewer within said predefined area, wherein said display unit is configured for displaying said holographic image of said object at said calculated location.

Item 8. The system according to item 7, wherein said positioning unit is further configured for:
detecting the eye position of each viewer;
wherein said processing unit is configured for:
determining a field of vision of each viewer present in said area based on said detected eye position; and
calculating said location based on said determined field of vision.

Item 9. The system according to item 7, wherein said positioning unit is further configured for detecting the position of one or more objects present in said predefined area.

Item 10. The system according to item 7, wherein said at least one sensor is further configured for detecting the light conditions in said predefined area.

Item 11. The system according to item 10, wherein said at least one sensor is further configured for detecting position of one or more light sources and a direction of light from said one or more light source.

Item 12. The system according to item 7, wherein said positioning unit is comprised in a communication device of at least one viewer.

Item 13. The system according to item 7, wherein said at least one sensor is comprised in a communication device of at least one viewer.

Item 14. The system according to item 7, wherein said processing unit is comprised in a communication device of each viewer.

Item 15. The system according to item 7, wherein said processing unit is comprised in a cloud service.

The invention claimed is:

1. A method for displaying of a holographic image of an object in a predefined area comprising:
   detecting a position of a plurality of viewers present in said predefined area;
   detecting the eye position of each viewer;
   determining a triangular field of vision of each viewer present in said area based on a view span of a depth camera of a respective optical head mounted device of each viewer present;
   detecting environmental conditions within said predefined area;
   determining a location for displaying said holographic image of said object based on said detected position of said plurality of viewers, said detected environmental conditions, and said determined triangular field of vision of each viewer present, wherein said determined location includes an area calculated as an area that is common to, and most covered by, overlapping areas of the determined triangular field of vision of each viewer present; and
   displaying said holographic image of said object at said determined location.

2. The method according to claim 1, wherein the triangular field of vision is a triangle that spans between 90-150 degrees.

3. The method according to claim 1, wherein detecting environmental conditions further comprises detecting the position of one or more objects present in said predefined area.

4. The method according to claim 1, wherein detecting environmental conditions further comprises detecting the light conditions in said predefined area.

5. The method according to claim 4, wherein detecting the light conditions further comprises detecting position of one or more light sources and the direction of light from said one or more light source.

6. A system for displaying of a holographic image of an object in a predefined area comprising:
   at least one positioning unit configured for:
      detecting positions of a plurality of viewers within said predefined area; and
      detecting the eye position of each viewer;
   at least one sensor configured for detecting the environmental conditions within said predefined area;
   a processing unit configured for:
      collecting data comprising said detected positions of viewers and detected environmental conditions;
      determining a triangular field of vision of each viewer present in said area based on a view span of a depth camera of a respective optical head mounted device of each viewer present; and
      determining a location for displaying said holographic image of said object based on said collected data and said determined triangular field of vision of each viewer present, wherein said determined location includes an area calculated as an area that is common to, and most covered by, overlapping areas of the determined triangular field of vision of each viewer present; and
   a display unit assigned to each viewer within said predefined area, wherein said display unit is configured for displaying said holographic image of said object at said determined location.

7. The system according to claim 6, wherein said positioning unit is further configured for detecting the position of one or more objects present in said predefined area.

8. The system according to claim 6, wherein said at least one sensor is further configured for detecting the light conditions in said predefined area.

9. The system according to claim 8, wherein said at least one sensor is further configured for detecting a position of one or more light sources and a direction of light from said one or more light source.

10. The system according to claim 6, wherein said positioning unit is comprised in a communication device of at least one viewer.

11. The system according to claim 6, wherein said at least one sensor is comprised in a communication device of at least one viewer.

12. The system according to claim 6, wherein said processing unit is comprised in a communication device of each viewer.

13. The system according to claim 6, wherein said processing unit is comprised in a cloud service.

* * * * *